United States Patent
Wilson

[11] 3,842,637
[45] Oct. 22, 1974

[54] COMBINE DRIVE TORQUE SENSING

[75] Inventor: Ronald E. Wilson, Lee's Summit, Mo.

[73] Assignee: Allis-Chalmers Corporation, Milwaukee, Wis.

[22] Filed: Jan. 22, 1973

[21] Appl. No.: 325,956

[52] U.S. Cl. .................. 74/230.17 M, 74/230.17 A
[51] Int. Cl. ........................................... F16h 11/06
[58] Field of Search ........... 74/230.17 M, 230.17 R, 74/230.17 A

[56] References Cited
UNITED STATES PATENTS

| | | | |
|---|---|---|---|
| 2,885,898 | 5/1959 | Malcon | 74/230.17 A |
| 3,616,706 | 11/1971 | Shimamoto | 74/230.17 M |
| 3,625,079 | 12/1971 | Hoff | 74/230.17 E |
| 3,722,308 | 3/1973 | Steven | 74/230.17 M |

FOREIGN PATENTS OR APPLICATIONS

| | | | |
|---|---|---|---|
| 597,706 | 8/1955 | Canada | 74/230.17 A |
| 1,206,797 | 2/1960 | France | 74/230.17 M |
| 1,001,901 | 1/1957 | Germany | 74/230.17 M |

*Primary Examiner*—Charles J. Myhre
*Assistant Examiner*—R. H. Lazarus
*Attorney, Agent, or Firm*—Kenneth C. McKivett

[57] ABSTRACT

This disclosure relates to a torque sensing sheave wherein one of the sheave sections is attached to a central shaft and the other sheave section is provided with a cam operatively connected to a matching cam carried by such shaft and including a spring biasing the cams apart and biasing such sheave sections together.

10 Claims, 6 Drawing Figures

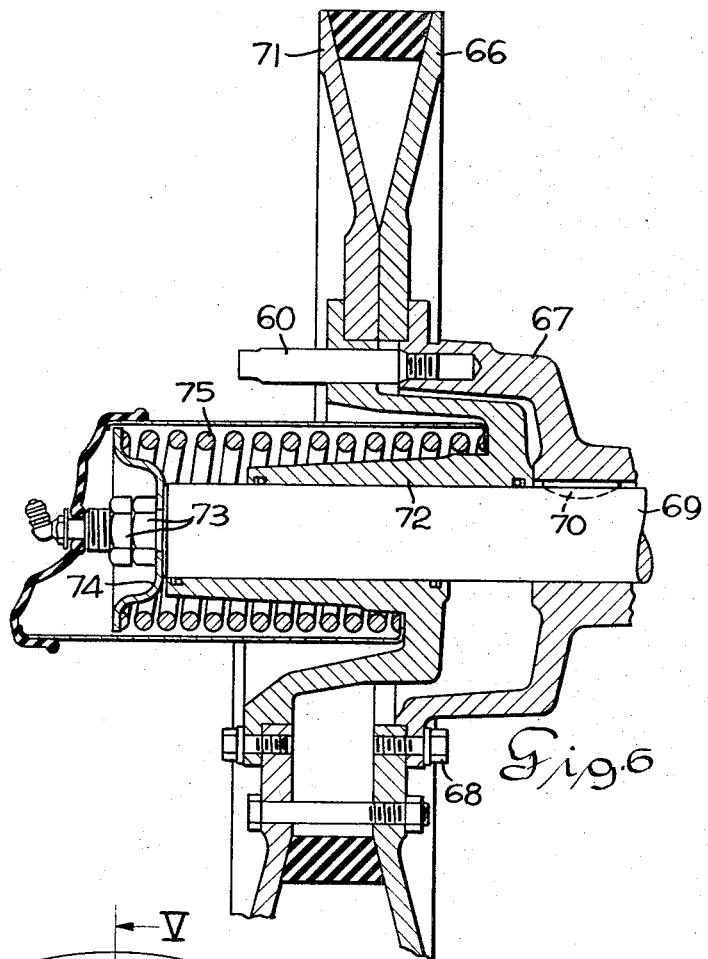
Fig.6
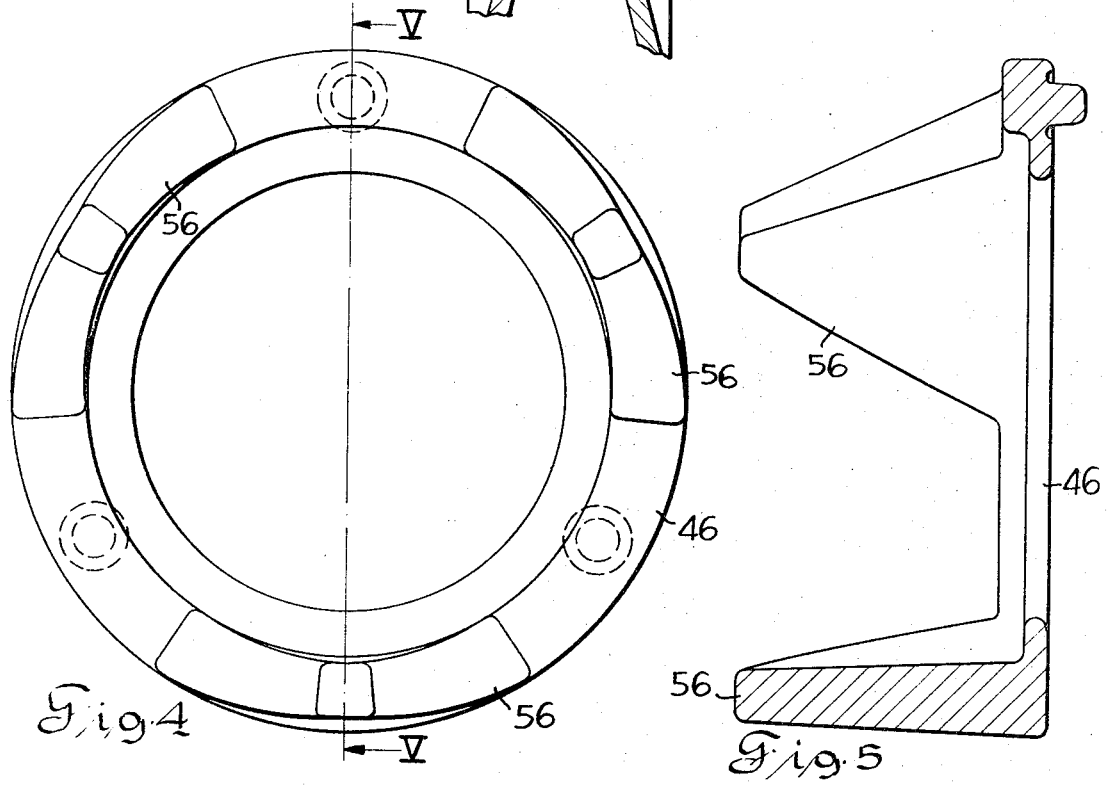
Fig.4
Fig.5

COMBINE DRIVE TORQUE SENSING

This invention relates to improvements in variable pitch diameter pulleys. And more particularly to a pulley of the type which will tighten the belt adequately to transmit peak loads without slippage.

A further object of this invention is to provide a self-adjusting pulley wherein such pulley senses the load being transmitted and adjusts belt tension to the correct level. The prior art manner of handling this problem was to have a spring-loaded driven sheave. The spring established a belt tension that was too high for light loads and too low for high loads and accordingly, the drive could not transmit peak power requirements and belt life was low.

Another object of this invention is to provide a torque sensing sheave which establishes a belt tension that is adequate for peak loads and allows very low belt tension at very low loads.

An object of this invention is to provide a self-adjusting pulley which provides adequate pressure against the belt in both the open and closed positions and all intermediate positions.

A further object of this invention is to provide demountable sheaves for ease of assembly and disassembly.

A further object of this invention is to provide a self-contained sheave unit wherein the unit can readily be removed from a shaft without disassembling the spring of the unit.

A further object of this invention is the use of identical forged or cast cams to achieve the torque sensing feature at low cost.

A further object of this invention is the incapsulation of identical cams with a compression spring, bearing and cover forming a unitary structure for ready removal and installation.

A further object of this invention is to provide a bearing which allows the sheave sections to rotate freely with respect to each other.

A further object of this invention is the provision of a complete torque sensing unit which can be removed from or installed on a shaft by removing or installing one nut and a washer.

A further object of this invention is to provide a torque sensing pulley which is attached by splines to a shaft closely adjacent the end thereof where bending stresses are very low.

The above object provides large journal diameter between sliding parts resulting in very low wear.

A further object of this invention is to provide a torque sensing pulley with a lube system using centrifugal force for providing grease to the journal surfaces as required and which supply of grease can be replenished by a grease zerk.

A further object of this invention is a provision of sheave sections in a torque sensing unit which may be removed and/or replaced individually.

A further object of this invention is the provision of a unitary torque sensing unit which can be repaired or inspected without inadvertently releasing the large spring force incorporated in such unit.

These and other objects of the invention will become apparent as the description progresses.

In order to afford a clearer understanding of this invention and of the manner in which the same may be carried out in practice, reference will now be made to the accompanying drawings forming part of this specification and illustrating partly diagramatically by way of example a typical embodiment of the invention. In the drawings:

FIG. 4 is a section view taken on line IV—IV of FIG. 2;

FIG. 5 is a section view taken on line V—V of FIG. 4; and

FIG. 6 is a section view similar to FIG. 2 showing the prior art of variable pitch diameter pulley.

Figures 1, 2, 3:
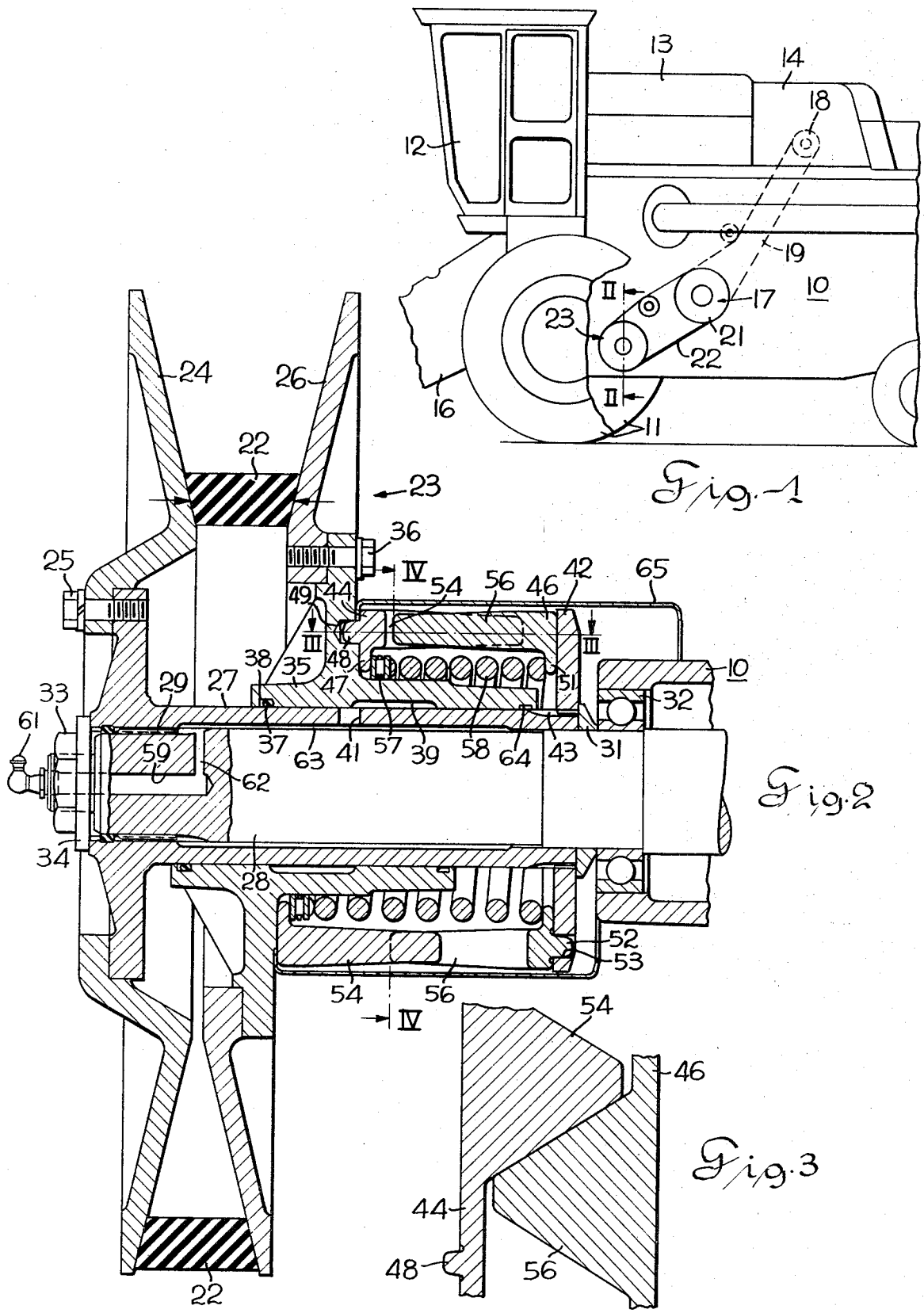
FIG. 1 is a side elevation view of a portion of a combine, with parts removed and embodying the present invention.
FIG. 2 is a section view taken on line II—II of FIG. 1.
FIG. 3 is a section view taken on line III—III of FIG. 2.

The invention is embodied in a self-propelled combine harvester having a main separator body 10, mounted on a pair of forward drive wheels 11, the left-hand drive wheel being partly broken away in FIG. 1 for purposes of clarity of illustration. An operator station 12 is mounted on the main body 10 forwardly of an elevated grain tank 13, and a conventional internal combustion engine 14 is mounted on the combine body rearwardly of the grain tank 13 and functions as a power source for propelling the combine and operating the harvesting and separating mechanisms thereof.

The combine typically carries a forward transversely elongated harvesting header (not shown) which removes the crop from the field and delivers it rearwardly to a conventional upwardly and rearwardly inclined feeder housing 16 which extends forwardly from the main separator body 10.

The combine is propelled by the engine 14 through an infinitely variable V-belt propulsion drive indicated generally by the numeral 17. The drive 17 includes an engine-driven pulley or sheave 18 which drives a belt 19 drivingly trained around one sheave of an inversely variable diameter sheave pair 21, the inversely variable diameter sheave pair 21 being schematically illustrated in FIG. 1 and being of conventional construction. The other sheave of the sheave pair 21 drives a second belt 22, which in turn drives torque sensing sheave 23 which functions as a drive sheave which drives wheels 11 through suitable conventional drive means (not shown).

Now referring to FIG. 2 which shows sheave 23 in section with the upper half of the figure showing sheave 23 in open position and the lower half showing sheave 23 in closed position as is conventionally done in the trade, it is seen that sheave 23 is made up of two sheave structures having V-belt engaging sheave sections 24 and 26. Sheave section 24 is attached to a central cylindrical sleeve 27 by means of bolts 25 and sleeve 27 surrounds shaft 28 which is drivingly connected to wheels 11 by conventional means (not shown) for driving same. Sleeve 27 is connected by means of splines 29 with the outer end of shaft 28 and sleeve 27 is retained on shaft 28 by the inner end thereof abutting spacer member 31 which is retained in position on shaft 28 by bearing 32 in which shaft 28 is rotatably supported. Bearing 32 is supported in separator body 10. The outer end of shaft 28 is threaded to receive a nut 33 which holds sleeve 27 on shaft 28. A washer 34 is interposed between nut 33 and sleeve 27.

Sheave section 26 is attached to a second sleeve 35 by means of bolts 36. Sleeve 35 is journaled on the periphery of sleeve 27. Sleeve 35 is provided with a seal 37 seated in a cylindrical groove 38 formed in the inner periphery of sleeve 35. Sleeve 35 is also provided with a cylindrical groove 39 for receiving grease from passage 41 in central sleeve 27.

First sleeve 27 has a radially extending plate 42 splined thereto at the inner end of such sleeve. As shown in FIG. 2 plate 42 is retained on splines 43 by contact with spacer 31 mounted on shaft 28.

A pair of identical ring or cam members 44 and 46 are mounted about shaft 28. Ring 44 is provided with a cylindrical base portion 47 in contact with a radial side of cylinder 35 and is provided with axially extending portions 48 which extend into holes 49 in sleeve 35 to provide a driving connection between sleeve 35 and ring 44 so that ring 44 will rotate with sleeve 35. Likewise ring 46 is provided with a cylindrical base portion 51 in contact with plate 42 and is provided with axially extending portions 52 which extend into holes 53 in plate 42 so that ring 46 will rotate with cylinder 27. Ring members 44 and 46 are provided with cams or cam parts 54 and 56, respectively, which face each other as is shown in FIG. 3 and provide a driving connection therebetween. A bearing assembly 57 is positioned in contact with base portion 47 of ring member 44 in surrounding relation to sleeve 35 and provides relative friction-free rotation of ring member 44 to ring member 46 when cams 54 and 56 are not in contact. A coil spring 58 is positioned about cylinder 35 between cylindrical bearing assembly 57 and cylindrical base portion 51 of ring 46. Spring 58 tends to move cams 54 and 56 axially apart. There are three such cams 54 on each ring 44 and three such cams 56 on each ring 46 as is shown in FIG. 4.

The outer end of shaft 28 is drilled to provide an axial passage 59 for grease. A zerk fitting 61 is connected to the outer end of such passage. The inner end of such passage is provided with a radial passage 62 connecting up with a cylindrical opening 63 in sleeve 27 extending about shaft 28 so that grease entering zerk 61 will pass through passage 59 into radial passage 62 into opening 63 and through passage 41 into groove 39 and thence such grease will work along the periphery of cylinder 35 to groove 64 and out from under the end of cylinder 35 to be then slung by centrifugal force onto cams 54 and 56 and the other elements contained within container 65 which surrounds the aforementioned torque sensing unitary structure. The container 65 is cylindrical in shape and serves as a retainer for cam members 44, 46 and spring 58 by virtue of radially inward extending flanges at its opposite axial ends which are in axial thrust transmitting relation to the cam members 44, 46.

Referring to FIG. 2, assume belt 22 is in the upper position shown. Belt 22 is moving into the paper and if it is transmitting any power half of such power goes directly to sheave section 24 and directly into shaft 28. The other half of the power is fed into sheave section 26 and this sheave section is free to rotate with respect to sheave section 24 except it is attached to cam 54 which mates with identical cam 56 attached to plate 42 which is splined to shaft 28.

There is an axial side force indicated by the arrows (FIG. 2) on the sides of belt 22 and this force is the sum of the spring 58 force plus the force from cams 54 and 56. As the horsepower being transmitted increases at a given rpm the torque transmitted through cams 54 and 56 increases providing an increased force on the sides of belt 22. Correspondingly, when the horsepower being transmitted decreases a lessening of the force on the sides of belt 22 is provided. Thus the advantage of this construction is that a lower side force on the belt can be used to provide good belt life at low horsepower requirements and also peak horsepower requirements can be met without slippage. In other words, this construction provides the best of two worlds, no slip with good belt life.

FIG. 6 shows the prior art type of construction over which the present construction is an improvement. In this construction, sheave section 66 is attached to hub 67 as by bolts 68 and hub 67 is keyed to shaft 69 by half-moon key 70 at a point which produced a rise in stress at the key whereas in applicant's embodiment such rise in stress is eliminated by having the splines located at the end of the shaft where the bending stresses are low.

FIG. 6 also shows a sheave section 71 connected to a hub 72 which is rotatably mounted on shaft 69 which is threaded at one end to receive nuts 73. A retaining cap 74 is interposed between nuts 73 and shaft 69. A spring 75 is positioned between cap 74 and hub 72 for biasing hub 72 towards the right. It is readily apparent that the bias exerted by spring 75 if it is correct for the open position of sheave sections 66 and 71, such bias will not be correct for the closed position and therefore the sheaves will not be able to transmit maximum power and belt life will be shortened. In addition, it is apparent that FIG. 6 does not show a construction that can be removed or installed as a unit and without taking all bias out of spring 75 and this construction uses dowels 60 to transmit torque from sheave section 66 to sheave section 71.

Referring to FIG. 2, if it is desired to remove the torque sensing unit 23, the following steps are taken: belt 22 is removed and this results in sheave sections 24 and 26 moving to the closed position shown in the lower part of FIG. 2. Now nut 33 is loosened which results in a separation between spacer 42 and hub 27 until spring 58 is captured or the spring force is contained by the external cover 65 at which point nut 33 and washer 34 can be removed and the whole assembly 23 can be slid off of the shaft without further disassembly. The unit can be installed on the shaft in the opposite manner.

It is also apparent that sheave sections 24 and 26 can be readily removed or replaced. To take off sheave section 24 bolts 25 are removed, sheave section 24 can now be moved toward the left away from the assembly. If it is desired to remove sheave section 26 then section 24 is first removed in the manner already described, then bolts 36 are removed and sheave section 26 can be moved to the left until it clears zerk 61. The installation of sheave sections 26 and 24 would be just the opposite steps.

The embodiments of the invention in which an exclusive property or privilege is claimed are defined as follows:

1. A torque sensing variable diameter V-belt transmission assembly comprising:
   a first sheave structure having
   a central sleeve adapted at its inner diameter to slide onto one end of a power transmitting shaft and adapted to connect to said shaft so as to rotate therewith and a first V-belt sheave section rigidly secured to and extending radially outward from one end of said central sleeve, a second sheave structure having
a sleeve part rotatably and axially slidably mounted on the radially outer diameter of said central sleeve and
a second V-belt sheave section rigidly secured to and extending radially from said sleeve part, a first cam member connected in axially separable torque transmitting relation to said central sleeve and presenting a first axially extending cam part, a second cam member connected in axially separable torque transmitting relation to said second sheave structure and presenting a second axially extending cam part in axially shiftable torque transmitting engagement with said first cam part, compression spring means between said cam members urging the latter axially away from one another, and a retainer having portions in axial thrust transmitting relation to said cam members operable to limit relative axial movement of said cam members away from one another whereby said cam members and spring means are maintained together as a unitary package separable from said sheave structures.

2. The assembly of claim 1 wherein said retainer is cylindrical in shape, surrounds said cam members and spring means and shields said cam members and spring means from dirt when said assembly is installed on said shaft and wherein said portions extend radially inward at opposite ends of said retainer.

3. In a torque sensing transmission as recited in claim 2 and wherein said shaft is provided with a longitudinally extending grease passage extending from one end of said shaft and communicating with a radial passage in said shaft which in turn communicates with passages in said central sleeve and sleeve part whereby grease can move from said one end of said shaft to a position adjacent the end of said sleeve part to be distributed to elements within said retainer by means of centrifugal force.

4. In a torque sensing transmission assembly as recited in claim 1 and wherein bearing means surrounding said sleeve part are interposed between said spring means and one of said cam members for providing relative frictionless rotation between said sheave structures.

5. In a torque sensing transmission assembly as recited in claim 1 and wherein said cam members are identical.

6. In a torque sensing transmission assembly as recited in claim 1 and wherein said assembly is held on said shaft by a nut and washer and can be removed from said shaft by removing the associated V-belt, said nut and washer and sliding said assembly off of said shaft.

7. In a torque sensing transmission assembly as recited in claim 1 and wherein said sheave structures and unitary package are axially separable from one another when said assembly is removed from said shaft.

8. The assembly of claim 1 wherein said first cam member is adapted to abut shoulder means on said shaft thereby limiting axial movement of said first cam member in the direction away from said second cam member.

9. The assembly of claim 1 wherein said first sheave section is releasably secured to said central sleeve, said second sheave section is releasably secured to said sleeve part and the inner diameter of said second sheave section is greater than the outer diameter of said central sleeve, whereby said sheave sections may be removed from said assembly without removing the remainder of said assembly from said shaft.

10. A torque sensing variable diameter V-belt transmission assembly comprising:
a first sheave structure having
a central sleeve adapted for connection to one end of a shaft presenting a radially outwardly extending flange, and
a first sheave section releasably attached to the outer diameter of said flange,
a second sheave structure including
a sleeve part rotatably and slidably mounted on said central sleeve and presenting an outwardly radiating hub, and
a second sheave section having an inner diameter greater than said outer diameter of said flange, said second sheave section being releasably attached to said hub in opposed relation to said first section,
a pair of cooperating cam means mounted on and rotating with said central sleeve and sleeve part, respectively, in torque transmitting relation to one another, and
spring means positioned between said cam means biasing said cam means in axially opposite directions, said sheave sections being removable from said flange and hub, respectively, in the axial direction away from said cam means whereby said sheave sections may be removed without disassembly of the remainder of the transmission assembly.

* * * * *